United States Patent [19]

Bruce et al.

[11] Patent Number: 5,978,880
[45] Date of Patent: Nov. 2, 1999

[54] MULTI-SEGMENTED BUS AND METHOD OF OPERATION

[75] Inventors: Richard H. Bruce, Los Altos; Jean Gastinel, Palo Alto; William F. Gunning, Los Altos Hills; Michael Overton, Palo Alto, all of Calif.

[73] Assignee: Xerox Corporation, Stamford, Conn.

[21] Appl. No.: 08/447,648

[22] Filed: May 23, 1995

Related U.S. Application Data

[62] Division of application No. 08/024,877, Mar. 1, 1993, Pat. No. 5,685,004, which is a continuation of application No. 07/490,113, Mar. 6, 1990, abandoned.

[51] Int. Cl.$^6$ .................................................. G06F 13/00
[52] U.S. Cl. ........................................ 710/130; 395/500
[58] Field of Search .................................. 395/281, 285, 395/306, 309, 310, 307, 308, 500; 326/30, 86; 371/22.3

[56] References Cited

U.S. PATENT DOCUMENTS

| | | | |
|---|---|---|---|
| 4,296,469 | 10/1981 | Gunter et al. | 395/325 |
| 4,423,509 | 12/1983 | Frissel | 371/22.3 |
| 4,509,008 | 4/1985 | Dasgupta et al. | 371/22.3 |
| 4,562,535 | 12/1985 | Vincent et al. | 395/325 |
| 4,604,689 | 8/1986 | Burger | 364/200 |
| 4,716,526 | 12/1987 | Mori et al. | 364/200 |
| 4,750,177 | 6/1988 | Hendrie et al. | 371/32 |
| 4,764,926 | 8/1988 | Knight et al. | 371/22.5 |
| 4,827,476 | 5/1989 | Garcia | 371/22.3 |
| 4,845,663 | 7/1989 | Brown et al. | 395/575 |
| 4,897,837 | 1/1990 | Ishihara et al. | 371/22.3 |
| 4,899,307 | 2/1990 | Lenoski | 365/78 |
| 4,922,409 | 5/1990 | Schoellkopf et al. | 395/307 |
| 4,933,838 | 6/1990 | Elrod | 395/325 |
| 4,933,845 | 6/1990 | Hayes | 364/200 |
| 4,933,846 | 6/1990 | Humphrey et al. | 364/200 |
| 4,959,813 | 9/1990 | Todoroki | 365/189 |
| 4,964,046 | 10/1990 | Mehrgardt et al. | 395/250 |
| 4,965,723 | 10/1990 | Kirk et al. | 395/800 |

(List continued on next page.)

FOREIGN PATENT DOCUMENTS

| | | | |
|---|---|---|---|
| 0 344081 | 11/1989 | European Pat. Off. . | |
| 3 708887 | 9/1988 | Germany | G06F 13/40 |

OTHER PUBLICATIONS

Karp, Harry R., "Practical Applications of Data Communications", 1980, pp. 42–43.

Deane, D.A. and Franzon, P.D., "Multichip Module Technologies & Alternatives", 1993, pp. 5–6.

Beyers et al., "A 32–bit VLSI system," Digest of Papers, Spring Compcon 83, Feb. 28–Mar. 3, 1983, New york.

Blodgett, Albert J., Jr., "Microelectronic packaging" *Scientific American*, Jul. 1983, pp. 86–96.

Borrill, P., "Limits of backplane bus design," 1988 IEEE International Confernece on Computer Design: VLSI in Computers & Processes, Oct. 1988.

Bruce et al., "High bandwidth bus using multichip modules," National Electronics Packaging and Products Conference (NEPPC–West), Mar. 6–9, 1989.

"Fine–pitch pad grid arrays are key to Motorola's hyper-module," *Electronics*, Apr. 28, 1988, p. 78.

(List continued on next page.)

*Primary Examiner*—Ayaz R. Sheikh
*Assistant Examiner*—Rupal D. Dharia
*Attorney, Agent, or Firm*—Townsend and Townsend and Crew LLP

[57] ABSTRACT

A multi-level hierarchical bus architecture implemented with a multi-chip package and a modular shared-bus provides high bandwidth. All IC components are mounted on standardized multi-chip packages. Each multi-chip package includes bus interface chips for providing communication from the integrated circuits to a board bus. One multi-chip package contains additional bus interface circuitry for providing communication from the board bus to a backplane bus.

25 Claims, 7 Drawing Sheets

U.S. PATENT DOCUMENTS

| | | | |
|---|---|---|---|
| 4,974,153 | 11/1990 | Pimm | 395/325 |
| 5,006,982 | 4/1991 | Ebersole et al. | 395/325 |
| 5,050,066 | 9/1991 | Myers et al. | 395/575 |
| 5,097,410 | 3/1992 | Hester et al. | 395/851 |
| 5,119,483 | 6/1992 | Madden et al. | 395/375 |
| 5,173,864 | 12/1992 | Watanabe et al. | 364/491 |
| 5,193,158 | 3/1993 | Kinney et al. | 395/375 |
| 5,361,337 | 11/1994 | Okin | 395/467 |
| 5,388,230 | 2/1995 | Yamada et al. | 395/325 |
| 5,430,735 | 7/1995 | Sauerwald et al. | 371/22.3 |
| 5,491,428 | 2/1996 | Pan | 326/17 |
| 5,576,642 | 11/1996 | Nguyen et al. | 326/86 |

OTHER PUBLICATIONS

"Interposer multichip socket," Brochure of AMP, Inc. (Oct. 1988).

Principles of Digital Computer Design, Abd–Alla and Meltzer, pp. 150–155 (Prentice–Hall 1976).

Computer Architecture and Parallel Processing, Hwang and Briggs, pp. 264–269 (McGraw–Hill 1984).

"Microprocessors and Microcomputer Development Systems," by Rafiquzzaman, pp. 168–171, 176–177, 186–187, 584–587 (Harper & Row 1984).

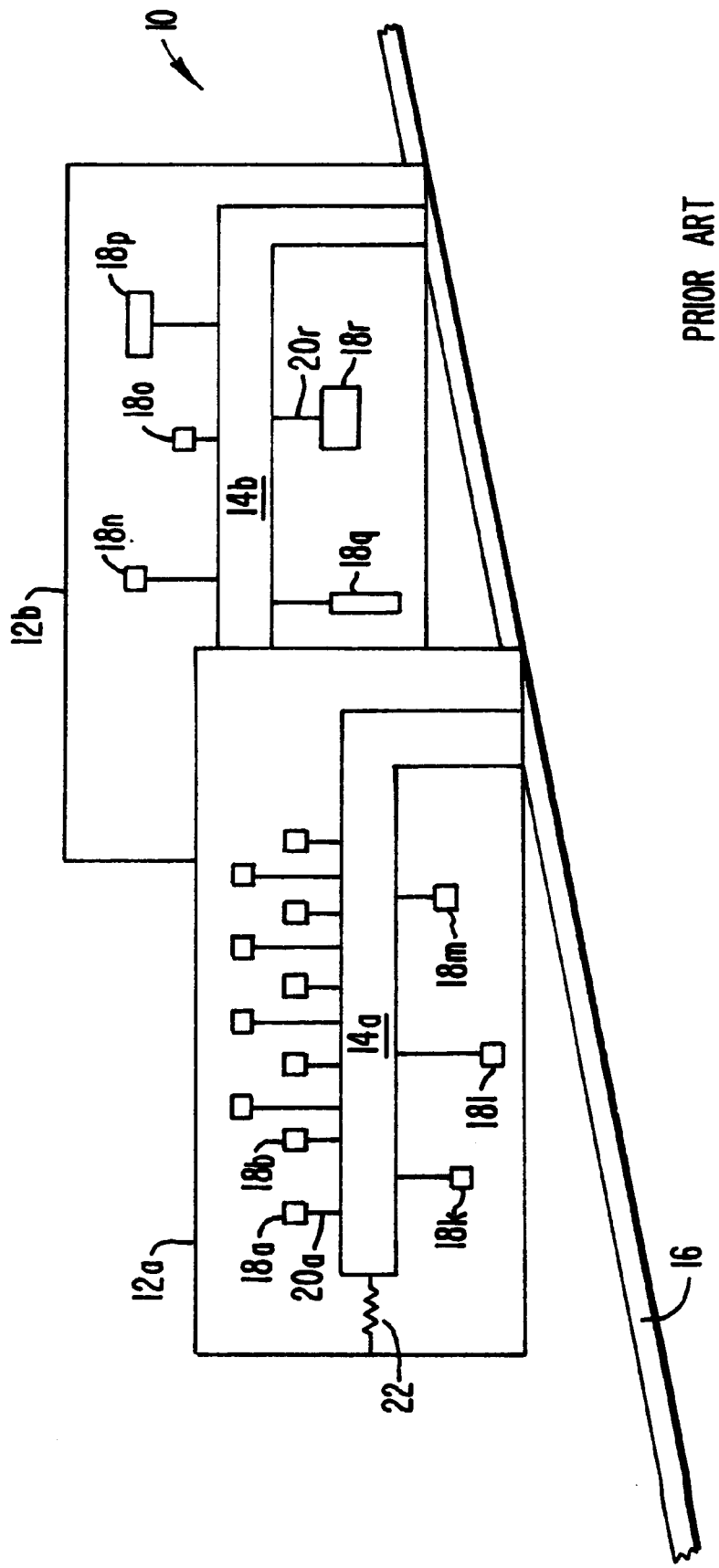
FIG._1.
PRIOR ART

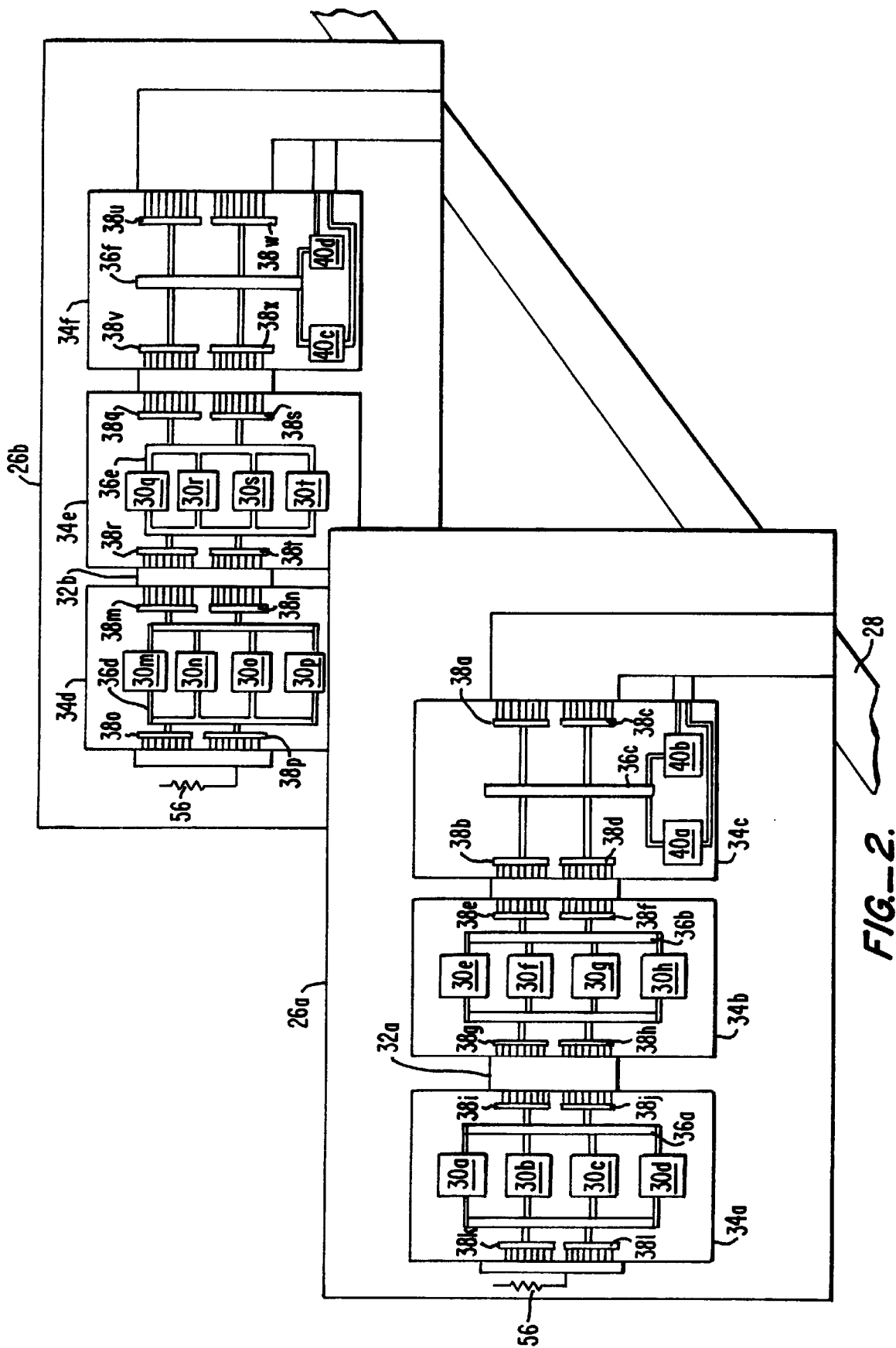
FIG._2.

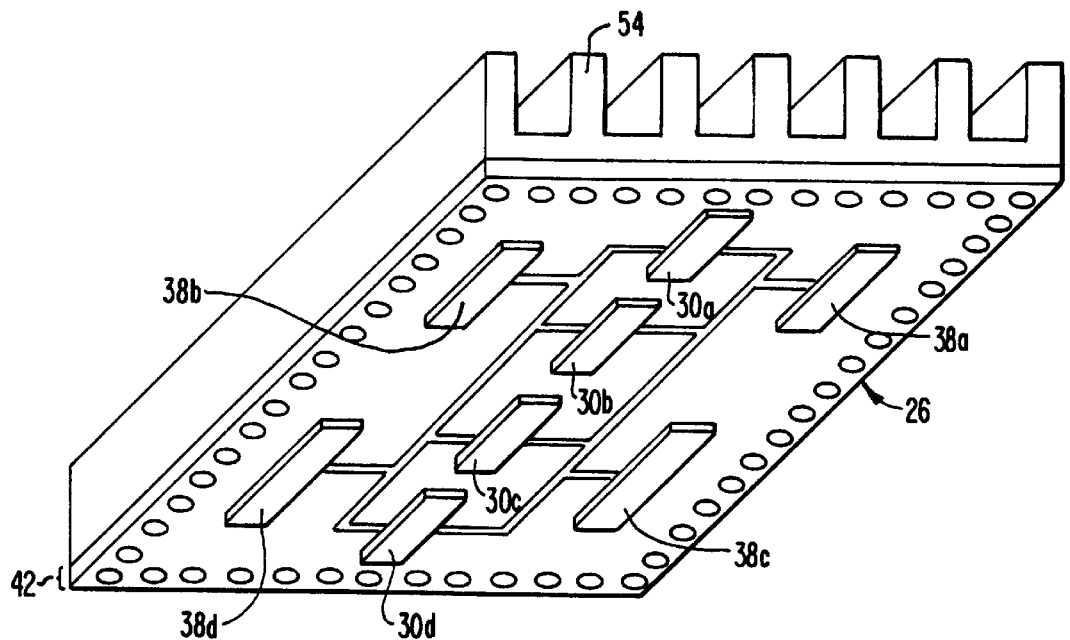
FIG._3.
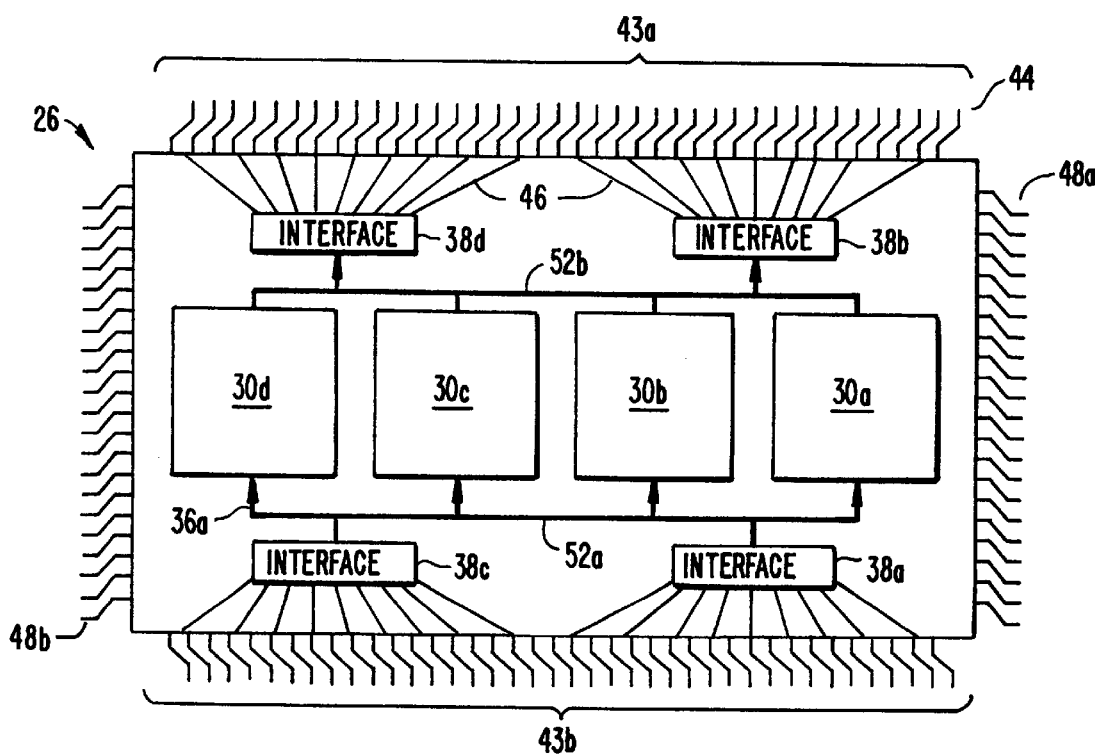
FIG._4.

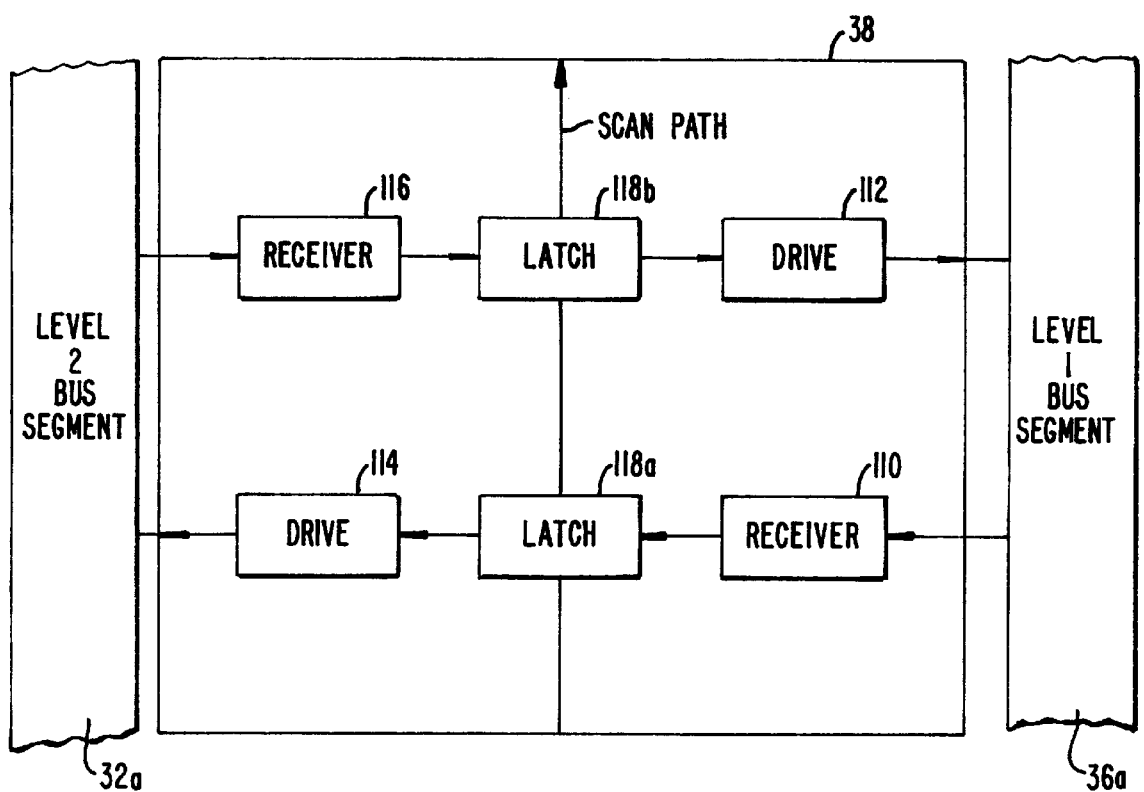
FIG._5.

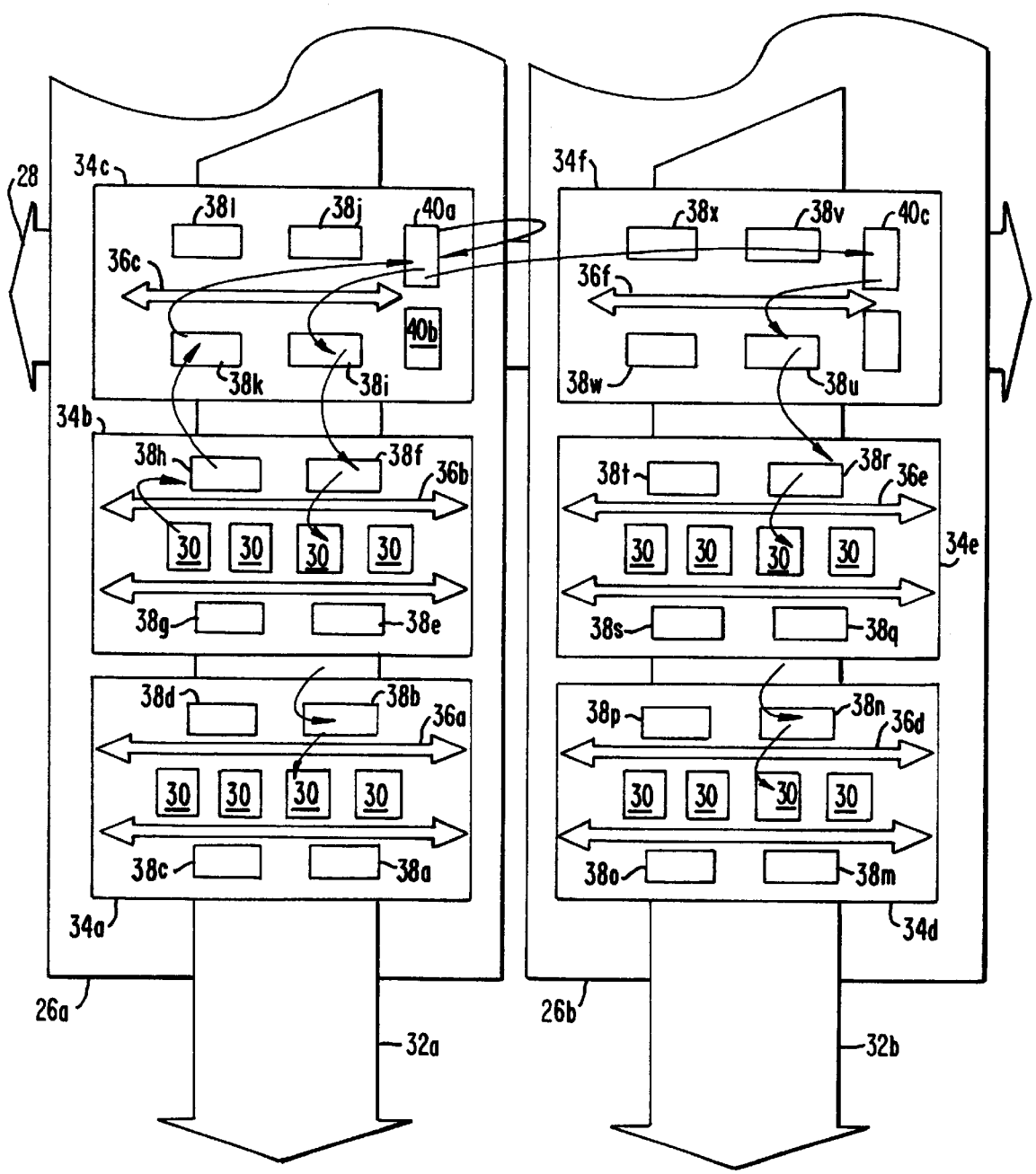
FIG._6.

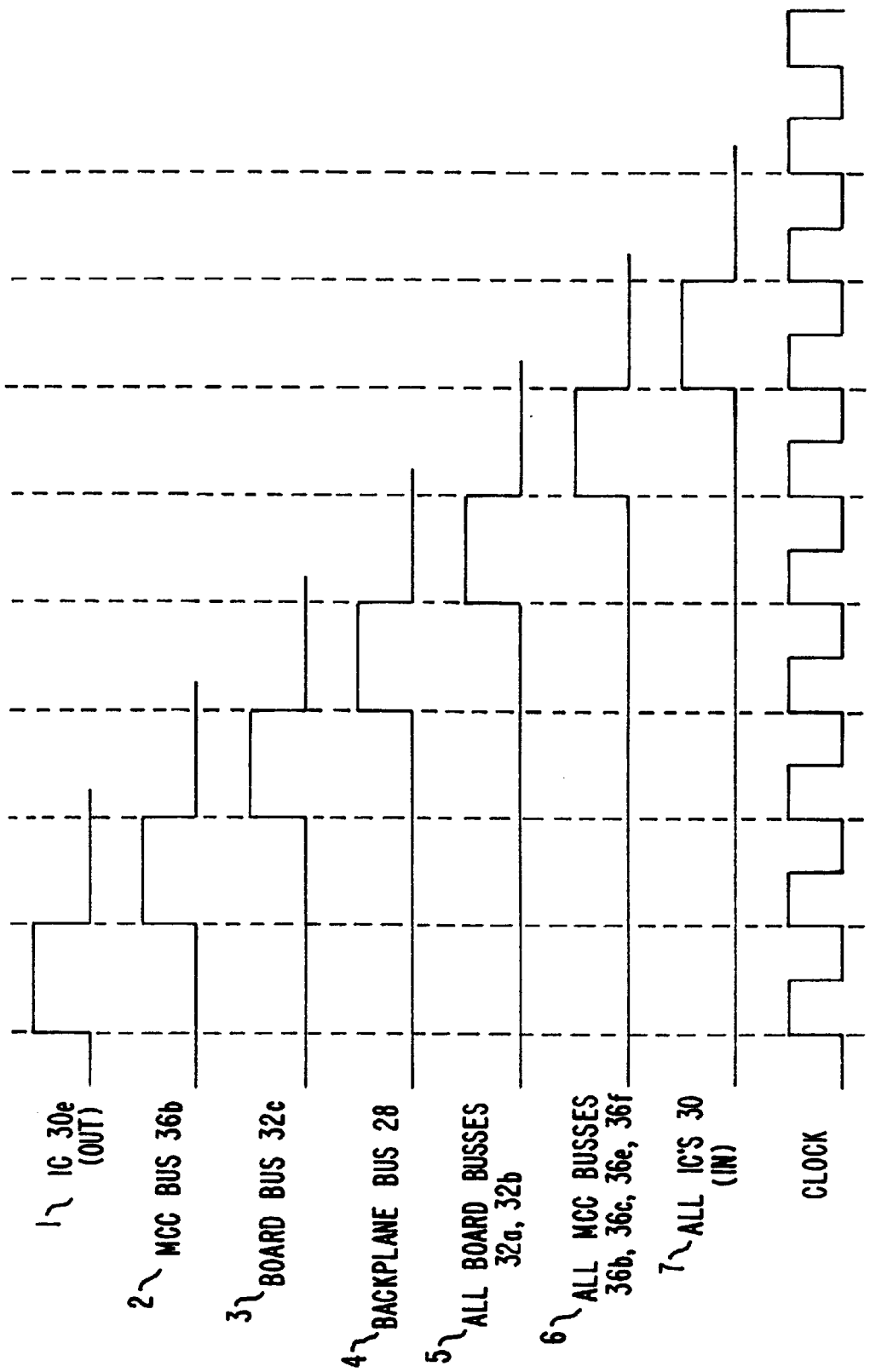
FIG._7.

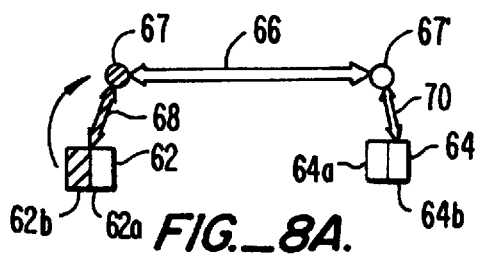
FIG._8A.
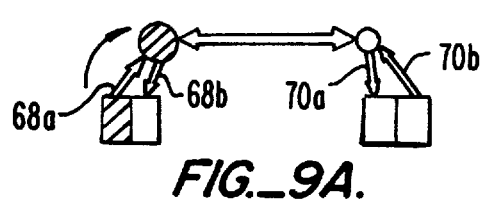
FIG._9A.
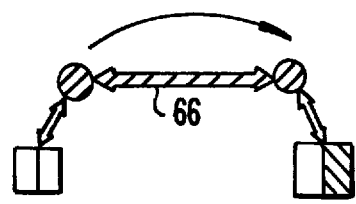
FIG._8B.
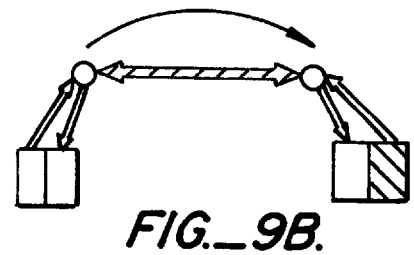
FIG._9B.
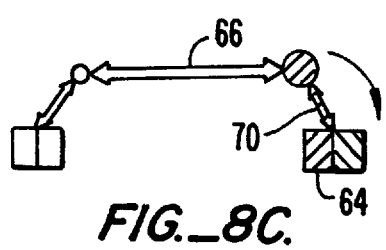
FIG._8C.
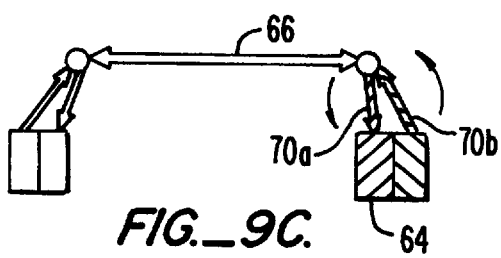
FIG._9C.
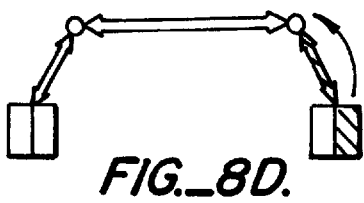
FIG._8D.
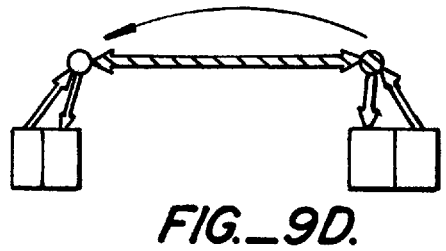
FIG._9D.
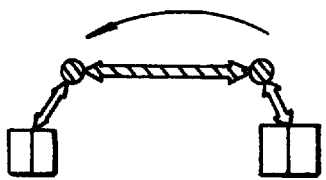
FIG._8E.
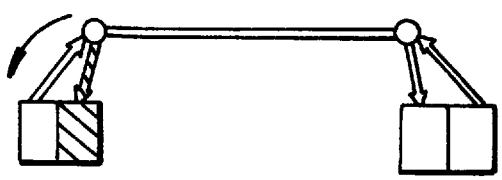
FIG._9E.
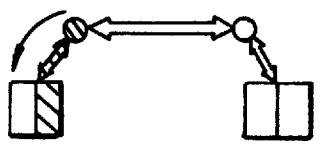
FIG._8F.

MULTI-SEGMENTED BUS AND METHOD OF OPERATION

This is a division of Ser. No. 08/024,877, filed Mar. 1, 1993, now U.S. Pat. No. 5,685,004, which is a continuation of Ser. No. 07/490,113, filed Mar. 6, 1990, now abandoned.

BACKGROUND OF THE INVENTION

The present invention relates to the field of chip carriers and bus architecture. More specifically, the invention relates to a multi-chip carrier for connection to a multi-segmented pipeline bus and its method of operation.

Large electronic devices such as computers typically include a plurality of individual integrated circuits or chips which must be interconnected for communication between the chips. Typically, each chip is mounted in a chip carrier which is connected to one or more buses. The buses may be either a private bus in which all the components connected to the private bus are either the recipient or source of all the signals on the bus, or a shared bus. A shared bus may carry signals which, at any given time, are not being sent to or received from some of the chips connected to the bus. Rather, communication to or from the various connected chips is placed on the bus and each chip is provided with a device for determining whether the particular signal is pertinent to its operation. T he present invention is concerned with shared bus systems.

Communication systems can be unsegmented or multi-segmented. In unsegmented systems, a signal, once placed on the bus, propagates the length of the bus without a delay other than that required by the electrical characteristics of the bus and the connections thereto. In a segmented system, one or more registers are provided for holding a signal for a period of time. Thus, a signal will propagate on a first segment until it reaches a holding register where it will be held for a period of time. Later, the signal will be sent from the register to the next segment where it will propagate until reaching the termination of the bus or another register. When the signal is unusable by components which are attached to the bus during the period in which it is held in a register, such period is referred to below as the latency period of the bus.

SUMMARY OF THE INVENTION

The present invention includes the recognition of various deficiencies of previous devices. Previous devices have tended to minimize the latency by using a non-segmented bus. According to the present invention, it has been found that by using a multi-chip carrier with multiple segments, the latency which occurs in the system is outweighed by a number of advantages of the system such as increased bandwidth. It is particularly advantageous to accept latency as the price for an increase in bandwidth in multi-processor systems. This is because in multi-processor systems, the burden of latency is distributed among the various processors. In multi-processor systems, therefore, the more serious consideration is the bandwidth which determines the speed at which operations like a cache fill can be accomplished.

The present invention is directed to a segmented bus which employs bus pipelining. In a bus pipelining system, data which is travelling from a source to a destination travels from the source along a first bus segment and is held in at least one register for a period of time before being placed on a second bus segment and thereafter travelling to the destination. Pipelining processes have been known in the past for use in data processing in which the data is changed at one or more of the various pipeline segments. The present invention, however, is directed to a bus for use in data transmission rather than a bus for use in data processing. In a data transmission system, the data is not changed at the various pipeline segments or bus segments, but rather arrive at the destination in a form substantially identical to the form in which it left the source and having undergone substantially no information changes in its travel from the source to the destination.

The present invention includes a multi-segmented, high bandwidth bus. Providing high bandwidth includes both providing an effectively wide bus and providing a high frequency bus. Preferably the present bus is used at a frequency of at least 50 MHz, providing several hundred megabytes of data per second.

According to one embodiment of the present invention a plurality of chips are mounted on a multi-chip carrier (MCC) which includes a short bus segment. The multi-chip carrier includes bus interface chips (BIC) for providing communication between the MCC bus segment and the adjacent segment, namely the board bus. In one preferred embodiment, the multi-chip carriers are configured so that the input and output electrical characteristics of the BIC are identical for all multi-chip carriers, thus easing design constraints on both the chips and the system and increasing flexibility of the system. Each segment of the system operates during a segment cycle of a predetermined period, viz. the time elapsed between placing a signal onto the segment (e.g. from a preceding register) and the time the signal is placed onto the next segment (including the time the signal is held in the segment register or buffer). To assure no signals will be lost, the segment period must equal or exceed the segment propagation time (i.e., the time required for a signal to travel the full length of the segment), plus the segment overhead time (i.e. the time required for the signal to settle to a value so that it can be reliably read).

Several multi-chip carriers are mounted on each board. At least one of the multi-chip carriers contains additional bus interface chips which permit communication between the board bus and the adjacent bus segment, namely the backplane bus. The segments of the multi-segmented bus are balanced, i.e., similar delays occur in each pipeline segment.

The present invention is directed to a data communication bus, in which no computation or other modification of the data occurs between its source and destination. The bus includes a plurality of bus segments. The bus preferably includes a plurality of bus levels. Each bus segment in the system can communicate with a bus on an adjacent level. Except for the highest level and lowest level bus segments, preferably all bus segments can both communicate to a higher level bus segment and a lower level bus segment. The bus levels are substantially ordered in the sense that no bus segment can communicate directly with any other bus segment than those on the same or an adjacent level. Communication between bus segments is accomplished using registers for holding the data. Thus, data which is placed on a given bus segment will be held in a register before being placed on an adjacent bus segment. Because the bus is a communication bus and does not involve data computation, data which is received from a first register, transmitted along a bus and stored in a second register is unchanged in the sense that the information in the first register is substantially or identical to the information in the second register. When that data is, in turn, transmitted from the second register, over a second bus segment to a third register, the data received in the third register has information which is substantially identical to the information sent from the first and second registers.

The multi-chip carrier and bus system of the present invention have well-defined characteristics making it easier to predict the response of the system. Compared with previous devices, the system provides increased bandwidth and provides for substantially simultaneous receipt of signals at all destinations. The multi-chip carrier is designed to eliminate the need for bus loading and reduces capacitance while also reducing bus noise and loading, and permitting high frequency operation. The present invention utilizes uni-directional buses at least in the lower segments to provide better efficiency in bus utilization. In the present invention, segmentation of the bus provides a reduced effective bus length (i.e. effective source-to-destination length) and signal propagation time which permits higher frequency communication such that more information can be transmitted.

Reference is made to R. Bruce, et al. "High Bandwidth Bus Using Multichip Modules", incorporated herein by reference.

BRIEF DESCRIPTION OF THE DRAWINGS

FIG. 1 schematically illustrates the connection of IC components to a bus according to previous devices;

FIG. 2 schematically depicts connection of IC devices to a multi-segmented bus according to the present invention;

FIG. 3 is a perspective view of a multi-chip carrier according to the present invention;

FIG. 4 is a schematic bottom plan view of a multi-chip carrier according to the present invention;

FIG. 5 is a block diagram of a Bus Interface Chip;

FIG. 6 depicts the pipeline stages of bus communication according to the present invention;

FIG. 7 is a timing diagram, corresponding to FIG. 6;

FIGS. 8a–8f depict multi-segmented bus communication using bi-directional buses; and FIGS. 9a through 9e depict multi-segmented bus communication using unidirectional buses according to the present invention.

DETAILED DESCRIPTION OF THE PREFERRED EMBODIMENTS

The description of the present invention will include a description of certain differences from previous devices. FIG. 1 depicts schematically a backplane and board bus system 10. According to this system, a plurality of boards 12a, 12b each containing a board bus 14a, 14b, are connected to a common backplane bus 16. Each board 12a, 12b also contains a plurality of integrated circuits or chips, each mounted in a chip carrier 18a through 18r. Each chip is connected by a line or private bus 20a through 20r to the board buses 14a, 14b. Typically, such as system is non-segmented, i.e., a signal which is placed on the backplane bus 16 will propagate directly onto the board buses 14a, 14b without being stored in a register or buffer. The board buses 14a, 14b are connected to terminal resistors 22 to simulate an infinite-length bus 14a and thus to prevent unwanted reflection from the end of the bus 14a.

The various integrated circuit chips 18a through 18r are typically designed to drive the largest load which is likely to be encountered. For this reason, the ICs must typically be designed to drive relatively large loads.

As shown in FIG. 2, one embodiment of the present invention includes a plurality of boards 26a, 26b connected to a backplane bus 28. However, in this case, the integrated circuits 30a through 30r are not connected individually to the board buses 32a, 32b. Instead, the integrated circuit chips 30a through 30r are mounted on a plurality of multiple chip carriers (MCC) 34a through 34f. The MCC's 34 are in turn, mounted on the boards. The MCC's are preferably surface mounted to reduce capacitive loading on the bus and increase the packing density. Each MCC 34 contains an MCC bus 36a through 36f. The MCC's 34 also include bus interface chips (BIC) 38a through 38x for controlling communication between the MCC 34 and the board bus 32. An additional set of BIC's 40 provides communication between the board buses 32a, 32b and the backplane bus 28. In the embodiment depicted in FIG. 2, the additional set of BICs 40 are located on one of the MCCs 34c, 34f on each board 26a, 26b, although the additional BICs 40 could be located elsewhere, such as being mounted on the board. High bus bandwidth is achieved at least partly because the shared bus is segmented into several shorter busses, each with fewer components attached, compared to previous bus configurations.

FIGS. 3 and 4 depict a single MCC. The silicon substrate of the MCC is connected to a copper or aluminum finned heat sink 54. The substrate 42 is mounted with the integrated circuits 30, 38 facing the board 26 so that heat can be transferred through the heat sink 54 which is exposed to air for cooling.

Integrated circuits 30a, 30b, 30c, 30d are connected to the MCC bus 36a, e.g., using conventional wirebonding with a 0.007 in. (0.18 mm.) pitch. A silicon substrate 42 includes, in the preferred embodiment, 2 layers of metal interconnect and ground and power planes fabricated using typical integrated circuit processing technology. The metal interconnect includes the signal traces which make up the MCC bus 36A as well as the traces which connect the BICs 38a through 38d to the MCC bus 36a. The signal interconnect traces are preferably aluminum with a three micron thickness and a minimum width of 25 microns with 100 micron separation from adjacent features. The metal levels are separated by an insulating polyimide film and are connected vertically using 15 micron vias.

Each multi-chip module is connected to the board 26a, 26b through a connector. In the preferred embodiment, the connector is similar to those sold under the trademark "INTERPOSER", manufactured by AMP, Incorporated, Harrisburg, Pa. Preferably, the connector produces no more than about 0.6 pF capacitance and 1.4 nH inductance. Total loading on the bus signal path is about 5 pF. Preferably there is one pin dedicated to ground or power for every two bus driver pins on the MCC. In the preferred embodiment, the MCC connectors have a spacing of 0.025 inches (0.6 mm.) with about 100 bus pins on each of two opposed edges and about 100 external connection pins on each of the two remaining edges.

Preferably, signals on the board bus 26a are bit-sliced such that each BIC handles both incoming and outgoing signals. Preferably there are an equal number of incoming and outgoing signals along each of the two bus edges 43a, 43b of the MCC 26. This configuration, combined with the surface mount connection method, and the bus running underneath the MCC, provides for efficient connection because both opposed edges of the MCC can be utilized for bus communication. It is preferred to disperse the drivers and receivers in order to even out the current requirements of the BIC and to provide a simpler interconnect geometry for the MCC.

The BICs 38a, 38b, 38c, 38d are placed along opposite edges of the MCC 26. Such opposite-edge connectors are able to contact the board bus 32 because the board bus 32 passes underneath the surface-mounted MCC 34. This permits space-efficient connection while avoiding long tab length. As depicted in FIG. 5, the BICs include bus drivers and bus receivers. FIG. 5 depicts a BIC which is positioned between a level one bus 36a and a level two bus 32a although, as described, BICs can also be provided between other levels of the bus system. The BIC 38 is connected to the level one bus segment 36a by a receiver 110 for receiving data from the level one bus segment 36a and a driver 112 for sending data onto the level one bus segment 36a. The BIC 38 communicates with the level two bus segment 32a by a driver 114 for placing data onto the level two bus segment 32a and a receiver 116 for receiving data from the level two bus segment 32a. The bus drivers, according to one embodiment of the invention, are open drain N-channel CMOS transistors with nominal on resistance of about 3 ohms. The nominal signal levels are 2 V and 0.33 V. The bus receivers use a biased-gate configuration. Each driver and each receiver is connected to a synchronously clocked latch or register 118a, 118b in the BIC. When a signal resides on the level one bus segment 36a, it is obtained and preferably amplified by the receiver 110. A clock edge causes the latch 118a to store the received data. At the next clock edge, the data stored in the latch 118a is provided to the driver 114 which causes the data to be placed onto the level two bus segment 32a. A similar operation occurs when data is being sent from the level two bus segment to the level one bus segment. The data on the level two bus segment 32a is obtained and amplified by the receiver 116, and at a clock edge, stored at the latch 118b. At the next clock edge, the value stored in the latch 118b is amplified by the driver 112 and placed on the level one bus segment 36a. The receivers 116, 110 and drivers 112, 114 are configured to accept and provide data at predefined voltage levels. In one preferred embodiment, the BICs act to provide communication between a two volt level board bus 32a (FIG. 2) and a 5 volt CMOS level on the MCC bus 36a. The BICs 38 can be provided using a number of application technologies, preferably using two micron CMOS technology. The BICs 38 are preferably located close to the two opposing edges of the MCC, preferably about 2 millimeters from the edge. The BICs 38 are preferably provided with a relatively extreme aspect ratio, i.e. such that the BICs are long and narrow. In this manner, the BIC-to-bus connector leads 46 can be of minimal length thus minimizing inductance and capacitance problems. In the preferred embodiment, each lead has a capacitance of about 2 pF or less.

The other two edges of the MCC (i.e., the edges not adjacent the BICs) can be used to accommodate additional sets of connectors 48a, 48b, e.g., for providing communication other than over the shared bus system. Examples of such non-shared bus communication includes communication between a memory management unit mounted on a MCC and the memory which it controls and provision of control signals to the IC's. These edges are also used for communicating with the backplane bus 28 in those MCC's that have backplane BIC's 40.

The BIC's 38, by providing an interface between a group of integrated circuits 30 and a higher level bus such as the board bus 32, effectively relaxes design constraints on the integrated circuits 30 and also provides a degree of modularity of the MCCs 34. When individual integrated circuits 30 are directly connected to a higher level bus such as a board bus, the integrated circuits must be designed not only to have the proper functionality or logic but must also produce output with electrical characteristics (e.g. voltage and capacitance characteristics) compatible with the board bus 38. In previous devices, such as that depicted in FIG. 1, each integrated circuit was required to drive a signal at a high capacitance, for example about 200 pF over a relatively long bus, e.g. about 100 cm., typically connected to a load resistor 22. Thus, the IC designer was concerned not only with functioning or logic of the IC but also with meeting relatively stringent electrical characteristics for the IC output.

In the present invention, the ICs are not directly connected to a board bus, but to a relatively short, low capacitance, unloaded MCC bus 36. The BICs 38 perform the function of providing an output signal which is compatible with the board bus requirements 32. Because, according to the present invention, the electrical output requirements of the ICs are relaxed, i.e., relatively less difficult to meet, IC design becomes easier. It is no longer required that a single component meet both strict logic or functional requirements and strict electrical output requirements. Rather, one group of components, the ICs 30, are designed to produce the desired functionality or logic with relatively relaxed electrical output requirements while another set of components, the BIC's, provide the necessary electrical output characteristics.

The advantages of the BIC's are particularly pronounced when the group of ICs residing on an MCC are functionally related. For example, a particular MCC can be substantially dedicated to I/O control, memory control, processor operation or the like. Functionally related ICs on a single MCC can be redesigned or modified substantially without affecting the design or operation of functionally unrelated ICs on other MCCs.

The BICs are configured such that each MCC provides an output to the board bus which is substantially identical in certain electrical characteristics (viz. voltage and capacitance) to the output of every other MCC. For this reason, the particular functionality of an MCC is transparent to the board bus. In this sense, the MCCs are modular, i.e., substantially interchangeable.

Because the BIC is useful to convert the MCC electrical characteristics to the board bus characteristics, the present configuration is particularly useful when a bus segment at one level operates at a different voltage level than a bus segment at an adjacent level.

Furthermore, the described BIC configuration makes it possible to modify the backplane or board bus characteristics without substantially modifying the integrated circuits. Thus, if the board bus is modified to require a different electrical output, for example a different voltage, the BICs can be redesigned or replaced to provide the required output without substantially reconfiguring or redesigning the integrated circuits 30.

The MCC bus 36a is preferably composed of two unidirectional buses 52a, 52b. One bus, 52a is used for conveying signals from the board bus 32a to the chips 30. The second uni-directional bus 52b is used for conveying signals from the chips 30 to the board bus 32a. The signal path in each bus 52a, 52b is preferably less than about fifteen inches (about 38 centimeters) in some embodiments preferably less than about ten inches (about 25 centimeters) and in other embodiments preferably about three inches (about 7.5 cm). The MCC of the present invention makes the use of such short buses possible. The short bus length permits dispensing with bus termination when operating at frequencies up to about 100 megahertz. At this frequency the round trip propagation time for a signal is about one nanosecond. Thus, during a typical bus segment cycle, two or three reflections will occur in the bus segment before the signal on the bus is accessed. This provides time for reflection signals to decay to a magnitude small enough that they present no substantial problem. For this reason, it is not necessary to provide a load resistor on the MCC bus.

In the preferred embodiment, the board bus 32 strip line signal traces are 0.006 inches (about 0.15 mm.) wide and separated by 0.025 inches (0.63 mm.). Each board bus 32a, 32b is terminated with a 50 ohm load 56. Preferably, the board bus 32a, 32b is configured as two uni-directional buses, one for providing communication from the backplane bus 28 to the MCC, and the other for providing communication from the MCC to the backplane bus 28. The board is connected to the backplane using conventional board-to-backplane connectors such as those available from Burndy Corporation.

FIG. 6 depicts pipeline operation of the described system. In the configuration depicted in FIG. 6, communication originates from an IC in a first pipeline stage 1 and will arrive simultaneously at all ICs on all MCCs at the seventh pipeline stage 7. In the first stage 1, a signal is generated by a chip 30e on one of the MCCs 34b and travels over the MCC bus 36b to one of the BICs 38h. The BIC 38h contains a register for holding the signal which was sent from the chip 30f. The signal is held in the register until the beginning of the next bus cycle. During the next bus cycle 2 the signal is sent from the BIC 38f onto the board bus 32a. Once on the board bus 32a, the signal can be received by MCC 34c on the board bus 32a. In particular, the signal can be received by the MCC 34c which also contains the backplane interface chips 40a, 40b. The signal is received into one of the BICs 38k of the MCC 34c and held in the BIC 38k until the beginning of the third bus cycle.

In the third bus cycle 3, the signal travels from the BIC 38k over the MCC bus 36c to the backplane BIC 40a. The signal is held in the backplane BIC 40a register until the beginning of the fourth pipeline segment. During the fourth pipeline segment, 4, the signal which is held in the backplane BIC 40a is placed on the backplane bus 28. Once placed on the backplane bus 28, the signal can be received on any of the MCC's which contain backplane bus BICs 34c, 34f. In the preferred embodiment, there will be one such backplane-connecting MCC for each board 26a, 26b. The signal is received from the backplane bus 28 into the backplane BICs 40a, 40c of the backplane-connecting MCCs 34c, 34f on each board 26a, 26b. The signals are then held in the backplane BICs 40a, 40c until the beginning of the fifth pipeline segment.

During the fifth pipeline segment 5, the signal is transferred from each backplane BIC 40a, 40c onto the MCC bus 36c, 36f of each backplane-connecting MCC 34c, 34f and thence to a BIC 38i, 38u. The signal is held in the BICs 38i, 38u until the beginning of the sixth pipeline segment.

During the sixth pipeline segment 6, the signal is transferred from the BICs 38i, 38u onto the board buses of each board 32a, 32b. Once it has been placed on the board buses of each board 26a, 26b it is received onto a BIC of the MCC's in the system 38b, 38f, 38n, 38r. The signal is held in a BIC of each MCC until the beginning of the seventh pipeline segment. During the seventh pipeline segment 7 the signal is conveyed from the BICs 38b, 38f, 38n, 38r of each MCC onto the MCC bus of each MCC and thence is received at every integrated circuit 30 on every MCC in the system. In this way, a signal is sent from any integrated circuit in the system for receipt by every integrated circuit in the system in seven bus pipeline segments.

A timing diagram corresponding to the example of data communication is depicted in FIG. 7. In a first clock cycle 1 data is sent from one of the ICs 30f and travels over the MCC bus 36b on which the source IC 30f resides. In the second clock cycle 2 the data travels over the board bus 32a on which the MCC 34b is mounted. In the third clock cycle 3 the signal travels across the multi-chip carrier to the backplane coupling. In the fourth clock cycle 4 the data travels over the back plane bus 28 and is received in the BIC's of all MCC's which are coupled to the backplane. In the fifth clock cycle data travels over the MCC buses of the MCC's which are connected to the backplane. In the sixth clock cycle 6 data travels over the board bus. All backplane-connecting MCC's put it on their respective boards. In the seventh bus cycle 7 the data travels to all chips that are on the MCC bus.

The bottom line in the figures shows the clock signal which is the synchronizing signal for the synchronous bus. In a synchronous system, the registers all operate at a timing with respect to a single clock signal, i.e. all of the registers latch data and send data at substantially the same frequency and phase (disregarding, for example, normal clock slew). According to the present invention, all registers which are connected to a given bus segment are synchronous. Preferably all registers in the bus are synchronous. In order to minimize the time during which the signal is held in the various registers as described above, the various levels of the system (in this case, the MCC level, the board level, and the backplane level) are balanced in the sense that the time which is needed for a signal to travel from a component to the bus edge is about the same for each level of the bus. For example, it takes approximately the same amount of time for a signal to travel register-to-register on an MCC bus as to travel register-to-register the board bus or on a backplane bus. Because segment propagation times must not exceed segment periods, the propagation times of the bus segments are preferably balanced (i.e., approximately equal), at least in some bus segments such as the higher level bus segments, e.g., the board bus and backplane bus segments. Balanced propagation times mean that bottleneck situations are reduced or eliminated in which one or a few bus segments have a particularly long propagation time, thus requiring other, faster bus segments to operate at less than peak transmission efficiency in order to operate synchronously with the slower segments.

In the preferred embodiment, at least the lower level buses, i.e., the MCC bus and, preferably, the board bus 32 include two unidirectional buses. Thus, the MCC bus includes a first bus portion which is dedicated to communications which are travelling in the direction from the board bus 32a to an integrated circuit 30 and a second bus component which is dedicated to communications which are travelling from the integrated circuit 30 toward the board bus 32. Similarly, the board bus 32 contains a first bus component which is dedicated to communications which are travelling in the direction from a MCC 34 to the backplane bus 28 and a second bus component which is dedicated to communications which are travelling from the backplane bus 28 toward the MCC 34. An advantage of providing for such uni-directional buses is that communications can be travelling in both directions on any one bus pipeline segment during any one clock period. This permits a savings of time as depicted in FIGS. 6 and 7.

FIG. 8 depicts communication without unidirectional busses. FIG. 8 shows, schematically, communication from a first node 62 which can have, for example, an input buffer 62a and an output buffer 62b to a second node 64 also having an input buffer 64a and an output buffer 64b. Communication is over a segmented bus. The segmented bus includes a higher level bi-directional bus 66 which is joined to the nodes 62, 64 by lower level bi-directional buses 68, 70. FIG. 8 illustrates communication of a signal from the first node 62 to the second node 64 and from the second node 64 to the first node 62. In the first stage shown in FIG. 8A, this signal is sent from the output buffer 62b over the first lower level bus 68 to the upper level bus 66. In the second pipeline segment shown in FIG. 8B, the signal travels from one end of the upper level bus to the register 67' at the other end of the upper level bus 66. In a third segment, depicted in FIG. 8C, the signal is sent over the lower level bi-directional bus 70 from the upper level bus 66 to the second node 64. Note that even though there may be a signal in the output buffer 64b of node 64 this outgoing signal cannot be transmitted during the third pipeline segment because the lower level bus 70 is a bi-directional bus and is already in use, preventing further communication. Accordingly, it is necessary to wait until the fourth pipeline segment, shown in FIG. 8D to begin transmission of the signal from the second node 64. Transmission of the signal is completed as depicted in FIG. 8E and 8F. Thus, transmittal of a signal from the first node to the second node and from the second node back to the first node, requires six pipeline segments. Note that the upper level bus 66 is idle for four of these six segments, representing an inefficiency which can be improved upon.

The improved system according to the present invention, is depicted in FIG. 9. The device shown in FIG. 9 is similar to that of FIG. 8 except that the lower level bus includes two uni-directional buses 68a, 68b, 70a, 70b. FIGS. 9A and 9B are similar to FIGS. 8A and 8B. However, during the third pipeline segment depicted in FIG. 9C, since the lower level buses are unidirectional, it is possible to have simultaneous transfer of data from the upper level bus 66 to the second node 64 over the first uni-directional lower level bus 70a and also from the node 64 to the upper level bus 66 over the second uni-directional bus 70b. Communication of the signal is completed in FIGS. 9D and 9E which are similar to FIGS. 8E and 8F. Thus, according to the present invention, communication of a signal from a first node to a second node and from a second node back to the first node requires only five pipeline segments, representing a savings of one segment over the previous device. The upper level bus 66 is idle for only three out of five segments rather than four out of six. Providing uni-directional bus segments as shown, in the context of the disclosed synchronous segmented bus results in an increase in effective bandwidth of the bus system. When there are more than two bus segments, for example a low level segment, a mid-level segment, and a high level segment, further improvements can be realized by providing other bus segments as uni-directional segments so that signals can be simultaneously carried in either direction. In most cases, it is impractical to provide the backplane bus 28 as two uni-directional buses.

In light of the above description, a number of advantages of the present invention are apparent. The present invention provides high bus bandwidth together with substantial system design flexibility. The high bus bandwidth is particularly useful in multi-processor systems. Segmentation of the buses through pipelining introduces additional latency, but reduces the cycle time between stages. All components are surface mounted on multi-chip packages which interact with the system buses through interface chips. Thus, the drive requirements for the components are simplified. Because ICs for use in the connection with the MCC have reduced drive requirements (i.e., can be designed to drive smaller loads than typical for previous ICs) the ICs for use in the present invention can be designed to consume reduced power, thus reducing both the power drain problems and heat dissipation problems (on a per-chip basis). Furthermore, ICs with reduced drive requirements can be made physically smaller and the consequent savings in space can be used to provide additional logic. Such additional logic capacities are particularly useful in application specific integrated circuits (ASICs). Standardization of the packages allows system flexibility. Because a number of chips are housed in each multi-chip package, the total number of packages on the board is reduced. This is particularly useful in embodiments which implement wide uni-directional bus portions because such bus portions require a large number of pins. Thus, providing multi-chip packages where several chips share the same pin helps reduce the total number of pins on the board and thus the cost. The buses on all levels are balanced so that similar delays occur between pipeline stages. At the lowest pipeline stage, delay can be reduced since the bus length is shortened (less than about three inches, about 7.5 centimeters) and the bus loading is lowered (to less than about 20 pF). High pin count is possible in the MCCs by placing connection pads at a dense spacing (0.025 inches, about 0.6 millimeters) and contacting the buses on two sides of the package. This arrangement also allows for a symmetric board bus running under the packages which makes impedance matching easier. All major ICs are connected similarly to multi-chip packages to form modules which interface identically to the system buses. Thus, system configuration can be changed by using a different configuration of modules. For example, a module can contain memory control components, processor components, a mixture of both or IO components. Reconfigurations such as substituting memory for processing power can be implemented by routine changes in the board. Because of the modularity of MCCs, a distributor or a user can inventory MCCs to make it easier to modify or repair computing facilities. Boards can be added to the backplane for system expansion. Providing for multi-chip carriers on a board, rather than individual IC carriers on the board permits a higher density of ICs and simultaneously, permits providing a smaller bus length on each board, compared to previous devices.

The present invention is particularly advantageous in the context of a multi-processor system. A typical multi-processor system includes one or more cache devices for each processor. For a given implementation, it is possible to calculate, on a statistical basis, how often it will be necessary to use the bus to perform a cache fill and it will be known approximately how long each cache fill will take. The capacity of the bus thus places an upper bound on how many micro-processors can communicate on the bus without overloading the bus and destroying many of the advantageous of a multi-processor system. For this reason, one of the most critical aspects of a multi-processor bus system is the bus bandwidth. The present invention as described provides for a high bus bandwidth, at the cost of bus latency. However, the increase in bus bandwidth is believed to outweigh the disadvantages of latency, particularly in a multi-processor system in which the burden of latency is shared among the processors.

Because standard interface integrated circuits (BICs) are used for effecting bus interfaces, all other chips have a relatively relaxed requirement of driving 20 pF over three inches. This means that the function of the ICs is disassociated from the electrical problems associated with the high speed bus. Bus alterations require changes only to the BIC.

Inductance and capacitance problems are minimized by configuring the interface chips as relatively long (e.g., 14 millimeter) components which are mounted close to the package edge in order minimize stub length from the package edge to the chip pad.

A number of variations and modifications of the described invention can also be used. The invention as described can be scaled to smaller or larger sizes and also can be scaled in the sense that a larger number of bus segments can be used, for example, four, five, or more bus segments can be used in connection with the present invention. Although in the depicted embodiment BICs are provided on each MCC, such BICs could be deleted and the MCC bus could be directly connected to the board bus to effectively provide a single board-MCC bus segment on each board. In such a case, each chip could include a register for holding data to be placed onto the bus or which is received from the bus. Alternatively, each MCC could include one or more registers without having a BIC and do away with a level of pipelining. Although the preferred embodiment has been described as having certain dimensions and as using particular materials, other component dimensions and materials are operable as will be apparent to those skilled in the art.

Although the application has been described by way of a preferred embodiment and certain variations and modifications, other variations and modifications can also be used, the invention being defined by the appended claims.

We claim:

1. A synchronous segmented shared bus for communication in a computer comprising:
    a plurality of first-level bus segments;
    a plurality of multi-chip modules, each module having a first-level bus segment, each module having means for connecting a plurality of integrated circuit chips to said first-level bus segment;
    a plurality of second-level bus segments, at least one of said second-level bus segments forming a connection between a first and second of said multi-chip modules;
    at least one first-level bus interface chip on each said multi-chip module for storing and transferring data between one of said first-level bus segments and one of said second-level bus segments;
    at least one third-level bus segment forming a connection between a first and second of said second-level bus segments; and
    at least one second-level bus interface chip for storing and transferring data between one of said second-level bus segments and said third-level bus segment.

2. A synchronous segmented shared bus, as claimed in claim 1, wherein
    at least a first of said first-level bus interface chips provides an output to one of said second-level buses having a first voltage and a first capacitance; and
    at least a second of said first-level bus interface chips provides an output to one of said second-level busses having a voltage and capacitance substantially identical to said first voltage and said first capacitance.

3. A synchronous segmented shared bus, as claimed in claim 1, wherein
    at least a first and second of said multi-chip modules can be interchanged without substantially affecting operation of said second-level bus segment.

4. A synchronous segmented shared bus, as claimed in claim 1, further comprising:
    at least a second third-level bus segment connecting a third of said second-level busses and a fourth of said second-level busses; and
    at least a fourth-level bus segment connecting said first of said third-level busses and said second of said third-level busses.

5. A synchronous segmented shared bus, as claimed in claim 1, further comprising:
    means for transferring data from a first of said integrated circuit chips for receipt by all of said plurality of integrated circuit chips wherein said receipt of data by said plurality of chips is substantially simultaneous.

6. A synchronous segmented shared bus, as claimed in claim 1, wherein:
    said plurality of first-level bus segments have a length of less than about 15 inches.

7. A synchronous segmented shared bus, as claimed in claim 1, wherein:
    said plurality of first-level bus segments are formed without terminal load resistors.

8. A synchronous segmented shared bus as claimed in claim 1 wherein:
    at least one of said first-level segments includes a first unidirectional portion for providing data from one of said integrated circuits to one of said second-level bus segments and a second unidirectional portion for providing data from one of said second-level bus segments to one of said integrated circuits.

9. A synchronous segmented shared bus as claimed in claim 1, wherein:
    at least one of said second-level segments includes a first unidirectional portion for providing data from one of said first-level bus segments to said third-level bus segment and a second unidirectional portion for providing data from said third-level bus segment to one of first-level bus segments.

10. A synchronous segmented shared bus for communication in a computer comprising:
    a plurality of first-level bus segments;
    a plurality of multi-chip modules, each module having a first-level bus segment, each module having means for connecting a plurality of integrated circuit chips to said first-level bus segment, each module having first and second opposite edges;
    a plurality of second-level bus segments, at least one of said second-level bus segments forming a connection between a first and second of said multi-chip modules;
    at least first and second first-level bus interface chips on each said multi-chip module for storing and transferring data between one of said first-level bus segments and one of said second-level bus segments, said first and second first-level bus interface chips positioned adjacent said first and second edges, respectively;
    at least one third-level bus segment forming a connection between a first and second of said second-level bus segments; and
    at least one second-level bus interface chip for storing and transferring data between one of said second-level bus segments and said third-level bus segment.

11. A synchronous segmented shared bus as claimed in claim 10, further comprising:
    connector means for conductively connecting said first and second first-level bus interface chips to said second-level bus segment, said connector means having a length less than about 2 mm.

12. A method of segmented shared bus communication comprising:

providing at least a first-level, a second-level and a third-level bus segment;

providing a first-level interface chip for connecting said first-level bus segment with said second-level bus segment;

providing at least first and second-level interface chips for connecting said second-level bus segments with said third-level bus segment;

transmitting data over said first-level bus segment to said first-level interface chip and holding said data in said first-level interface chip, said transmitting and holding occurring during a first bus cycle having a first period;

receiving said data from said first-level interface chip on said second-level bus segment, transmitting said data over said second-level bus segment to said first second-level interface chip and holding said data in said first second-level interface chip, said receiving, transmitting and holding occurring during a second bus cycle having a second period substantially equal to said first period; and receiving said data from said first second-level interface chip on said third-level bus segment, transmitting said data over said third-level bus segment and holding said data in said second second-level interface chip, said receiving, transmitting and holding occurring during a third bus cycle having a third period substantially equal to said first period.

13. A method of segmented shared bus communication, as claimed in claim 12, wherein said step of transmitting data over said first-level bus segment includes transmitting said data over a first unidirectional portion of said first-level bus, and further comprising:

transmitting data over a second unidirectional portion of said first-level bus segment from said first-level interface chip simultaneously with said transmission over said first unidirectional portion.

14. A method of segmented shared bus communication comprising:

providing a plurality of first-level bus segments, a plurality of second-level bus segments and at least a first third-level bus segment;

providing a plurality of integrated circuit chips connected to said first-level bus segments;

providing a plurality of first-level interface chips for connecting said first-level bus segments with said second-level bus segments;

providing a plurality of second-level interface chips for connecting said second-level bus segments with said third-level bus segment;

transmitting data from a first of said integrated circuits over a first first-level bus segment to a first first-level interface chip and holding said data in said first first-level interface chip;

receiving said data from said first first-level interface chip on a first second-level bus segment, transmitting said data over said first second-level bus segment to a first second-level interface chip and holding said data in said first second-level interface chip;

receiving said data from said first second-level interface chip on said third-level bus segment, transmitting said data over said third-level bus segment and holding said data in said plurality of second-level interface chips;

receiving said data from said plurality of second-level interface chips on said plurality of second-level bus segments and holding said data in said plurality of first-level interface chips; and receiving said data from said plurality of first-level interface chips on said plurality of first-level bus segments, transmitting said data over said plurality of first-level bus segments and receiving said data substantially simultaneously in all of said plurality of said integrated circuit chips.

15. A method of segmented shared bus communication, as claimed in claim 14, wherein said step of transmitting data over said first first-level bus segment includes transmitting said data over a first unidirectional portion of said first first-level bus segment, and further comprising:

transmitting data over a second unidirectional portion of said first-level bus segment from said first-level interface chip and receiving in one of said integrated circuit chips simultaneously with said transmission over said first unidirectional portion.

16. In a synchronous segmented shared bus system having at least first, second and third bus segments, a multi-chip carrier comprising:

a substrate having first and second edges and first and second faces;

a plurality of conductive traces formed on said substrate and forming said first bus segment;

a plurality of integrated circuits positioned on said first face of said substrate and coupled to said first bus segment;

at least first and second bus interface chips for receiving data from said first bus segment, holding said data and transmitting said data to said second bus segment, said first and second bus interface chips positioned on said substrate adjacent said first and second edges.

17. A multi-chip carrier, as claimed in claim 16, wherein said second bus segment has a length of less than about 15 inches.

18. A multi-chip carrier, as claimed in claim 16, wherein said substrate lies substantially in a plane parallel to said second bus segment.

19. A multi-chip carrier, as claimed in claim 16, further comprising:

a plurality of cooling fins positioned on the second face of said substrate.

20. A multi-chip carrier, as claimed in claim 16, further comprising:

connector means for conductively connecting said first and second bus interface chips to said second bus segment, said connector means having a length less than about 2 mm.

21. A multi-chip carrier, as claimed in claim 16, wherein said first bus segment is formed without a terminal load resistor.

22. A multi-chip carrier, as claimed in claim 16 wherein:

said first bus segment includes a first unidirectional portion for providing data from one of said integrated circuits to said second bus segment and a second unidirectional portion for providing data from said second bus segment to one of said integrated circuits.

23. A multi-chip carrier, as claimed in claim 16, further comprising:

at least a third bus interface chip for receiving data from said second bus segment, holding said data and transmitting said data to said third bus segment.

24. In a synchronous segmented shared bus system having at least first, second and third bus segments, a circuit board comprising:

a board base;

a plurality of traces forming said second bus segment formed in said board base lying substantially in a plane;

at least a first multi-chip carrier mounted on said board base which includes:

a substrate having first and second edges and first and second faces;

a plurality of conductive traces formed on said substrate and forming said first bus segment;

a plurality of integrated circuits positioned on said first face of said substrate and coupled to said first bus segment;

at least first and second bus interface chips for receiving data from said first bus segment, holding said data and transmitting said data to said second bus segment, said first and second bus interface chips positioned on said substrate adjacent said first and second edges;

said second bus segment extending beneath said multi-chip carrier mounted on said board substantially between said first and second bus interface chips.

25. A circuit board, as claimed in claim 24, wherein said first multi-chip carrier provides an output to said second bus segment having a first voltage and a first capacitance and further comprising:

a second multi-chip carrier coupled to said second bus segment, said second multi-chip carrier providing an output to said second bus segment having a voltage substantially equal to said first voltage and a capacitance substantially equal to said first capacitance.

* * * * *